(12) United States Patent
Tokubo

(10) Patent No.: US 12,434,137 B2
(45) Date of Patent: Oct. 7, 2025

(54) DYNAMIC IN-GAME REFINEMENT OF CALIBRATION OF USER INPUT

(71) Applicant: Sony Interactive Entertainment Inc., Tokyo (JP)

(72) Inventor: Todd Tokubo, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 324 days.

(21) Appl. No.: 18/310,209

(22) Filed: May 1, 2023

(65) Prior Publication Data

US 2024/0367034 A1 Nov. 7, 2024

(51) Int. Cl.
*A63F 13/22* (2014.01)
*G06F 3/01* (2006.01)

(52) U.S. Cl.
CPC .............. *A63F 13/22* (2014.09); *G06F 3/017* (2013.01); *A63F 2300/8082* (2013.01)

(58) Field of Classification Search
CPC ... A63F 13/22; A63F 2300/8082; G06F 3/017
USPC .......................................................... 463/36
See application file for complete search history.

(56) References Cited

U.S. PATENT DOCUMENTS

| 7,785,197 | B2 | 8/2010 | Smith |
| 8,523,673 | B1 | 9/2013 | Boyd et al. |
| 8,751,215 | B2 | 6/2014 | Tardif |
| 9,684,430 | B1 | 6/2017 | Perigault |
| 10,179,291 | B2 | 1/2019 | Thomas et al. |
| 11,126,266 | B1* | 9/2021 | Xiao ...................... G06F 1/1626 |
| 11,402,917 | B2 | 8/2022 | Yokokawa |
| 12,131,586 | B2 | 10/2024 | Carlock et al. |
| 2002/0178011 | A1 | 11/2002 | Yotoriyama et al. |
| 2007/0191097 | A1 | 8/2007 | Johnson |
| 2009/0217211 | A1 | 8/2009 | Hildreth et al. |
| 2010/0112530 | A1 | 5/2010 | Schoenbach |

(Continued)

FOREIGN PATENT DOCUMENTS

| CN | 106943740 A | 7/2017 |
| EP | 3979050 A1 | 4/2022 |
| KR | 102304608 B1 | 9/2021 |

OTHER PUBLICATIONS

PCT/US2024/025785 Notification of Transmittal of the International Search Report and the Written Opinion of the International Searching Authority, or the Declaration, PCT/ISA/220, and the International Search Report, PCT/ISA/210, Sep. 2, 2024.

(Continued)

*Primary Examiner* — Allen Chan
(74) *Attorney, Agent, or Firm* — Fish & Richardson P.C.

(57) ABSTRACT

A method is provided for refining calibration of a user input for a video game, including: performing an initial calibration process for a user input for the video game, wherein the initial calibration process determines calibration settings for the user input; initiating gameplay of the video game using the calibration settings determined from the initial calibration, such that the calibration settings are applied to interpret instances of the user input occurring during the gameplay; determining a game context in which the instances of the user input occur; analyzing the determined game context, and adjusting the calibration settings based on the analysis of the determined game context.

23 Claims, 6 Drawing Sheets

(56) References Cited

U.S. PATENT DOCUMENTS

| | | |
|---|---|---|
| 2010/0199228 A1 | 8/2010 | Latta et al. |
| 2011/0059801 A1 | 3/2011 | Shigi et al. |
| 2011/0301934 A1 | 12/2011 | Tardif |
| 2012/0054646 A1 | 3/2012 | Hoomani et al. |
| 2013/0084978 A1 | 4/2013 | Olomskiy |
| 2014/0046661 A1 | 2/2014 | Bruner |
| 2014/0329208 A1 | 11/2014 | Jones et al. |
| 2016/0005336 A1 | 1/2016 | Peng et al. |
| 2016/0042228 A1 | 2/2016 | Opalka et al. |
| 2016/0059120 A1* | 3/2016 | Komorous-King ... A63F 13/211 463/36 |
| 2017/0173455 A1 | 6/2017 | Sheil et al. |
| 2018/0075659 A1 | 3/2018 | Browy et al. |
| 2018/0161683 A1 | 6/2018 | Thomas et al. |
| 2018/0260577 A1 | 9/2018 | Adams et al. |
| 2018/0345128 A1 | 12/2018 | Ahmed et al. |
| 2019/0038964 A1 | 2/2019 | Veeramani et al. |
| 2019/0171716 A1 | 6/2019 | Weber |
| 2019/0251344 A1 | 8/2019 | Menefee et al. |
| 2019/0340426 A1 | 11/2019 | Rangarajan et al. |
| 2019/0391662 A1 | 12/2019 | Yokokawa |
| 2020/0193714 A1 | 6/2020 | Browy et al. |
| 2020/0276497 A1* | 9/2020 | Nietfeld ................. G06F 3/014 |
| 2020/0298131 A1 | 9/2020 | Pinto et al. |
| 2020/0380793 A1 | 12/2020 | Browy et al. |
| 2021/0146255 A1 | 5/2021 | Taylor et al. |
| 2021/0390289 A1 | 12/2021 | Yang et al. |
| 2022/0096937 A1 | 3/2022 | Dorn et al. |
| 2022/0165013 A1 | 5/2022 | Velez et al. |
| 2022/0171960 A1 | 6/2022 | Nelson et al. |
| 2022/0188538 A1 | 6/2022 | Vieira et al. |
| 2022/0327309 A1 | 10/2022 | Carlock et al. |
| 2022/0343576 A1 | 10/2022 | Marey et al. |
| 2022/0362680 A1 | 11/2022 | Stafford et al. |
| 2023/0087879 A1 | 3/2023 | An et al. |
| 2024/0335737 A1 | 10/2024 | Bean et al. |
| 2024/0335740 A1 | 10/2024 | Bean et al. |
| 2024/0367055 A1 | 11/2024 | Black et al. |
| 2024/0375011 A1 | 11/2024 | Black et al. |

OTHER PUBLICATIONS

Uzma et al., "Advances in machine translation for sign language: approaches, limitations, and challenges," Neural Computing, London, May 18, 2021, 33(21):1-43.

Wikipedia.org [online], "Emote," Jan. 11, 2023, retrieved on Mar. 19, 2025, retrieved from URL< https://en.wikipedia.org/w/index.php?title=Emote&oldid=1132929070>, 2 pages.

\* cited by examiner

DYNAMIC IN-GAME REFINEMENT OF CALIBRATION OF USER INPUT

BACKGROUND OF THE INVENTION

The video game industry has seen many changes over the years. As technology advances, video games continue to achieve greater immersion through sophisticated graphics, realistic sounds, engaging soundtracks, haptics, etc. Players are able to enjoy immersive gaming experiences in which they participate and engage in virtual environments, and new ways of interaction are sought. Furthermore, players may stream video of their gameplay for spectating by spectators, enabling others to share in the gameplay experience.

Player inputs can require calibration prior to initiation of gameplay. However, if the result of such calibration is low quality, then the user must either redo the calibration or endure a poor quality gaming experience due to the low quality of the calibration.

It is in this context that implementations of the disclosure arise.

SUMMARY OF THE INVENTION

Implementations of the present disclosure include methods, systems and devices for dynamic in-game calibration of user inputs.

In one embodiment, a system is provided for calibrating captured poses of a user's hand, clustering categories of the input poses, and identifying the confidence score for the input detected. In one embodiment, the calibration system can ask the user in-game to provide input responses, such as "Did you mean to point here or did you mean to point there?" Based on the confirmation responses, the calibration step can improve its detection and identification of different poses by the user. In a further embodiment, confidence processing can also be performed on the captured inputs. Different conditions may increase or decrease the confidence values assigned to the captured inputs. In some embodiments, the confidence levels can also be adjusted based on the context of the input being tracked. In some embodiments, physical constraints can also be taken into consideration so that the inputs can be excluded when the captured inputs have very low confidence scores.

In some implementations, a method is provided for refining calibration of a user input for a video game, including: performing an initial calibration process for a user input for the video game, wherein the initial calibration process determines calibration settings for the user input; initiating gameplay of the video game using the calibration settings determined from the initial calibration, such that the calibration settings are applied to interpret instances of the user input occurring during the gameplay; determining a game context in which the instances of the user input occur; analyzing the determined game context, and adjusting the calibration settings based on the analysis of the determined game context.

In some implementations, the analysis of the determined game context identifies an object in a virtual environment of the video game towards which the instances of the user input were directed, and wherein adjusting the calibration settings includes using a property of the object in the virtual environment to adjust the calibration settings.

In some implementations, the analysis of the determined game context identifies a location in a virtual environment of the video game towards which the instances of the user input were directed, and wherein adjusting the calibration settings includes using the location in the virtual environment to adjust the calibration settings.

In some implementations, the game context includes activity occurring in the gameplay of the video game.

In some implementations, the activity is analyzed to determine an accuracy of the interpreted instances of the user input.

In some implementations, performing the initial calibration process further determines a confidence level of the calibration settings, and wherein the confidence level is adjusted based on the analysis of the determined game context.

In some implementations, the calibration settings are applied to a recognition model.

In some implementations, the user input is defined by gestures performed by a player of the video game.

In some implementations, a non-transitory computer-readable medium is provided having program instructions embodied thereon that, when executed by at least one computing device, cause said at least one computing device to perform method for refining calibration of a user input for a video game, said method including the following operations: performing an initial calibration process for a user input for the video game, wherein the initial calibration process determines calibration settings for the user input; initiating gameplay of the video game using the calibration settings determined from the initial calibration, such that the calibration settings are applied to interpret instances of the user input occurring during the gameplay; determining a game context in which the instances of the user input occur; analyzing the determined game context, and adjusting the calibration settings based on the analysis of the determined game context.

In some implementations, a computing device is provided having at least one processor and at least one memory, said computing device configured to perform a method for refining calibration of a user input for a video game, said method including the following operations: performing an initial calibration process for a user input for the video game, wherein the initial calibration process determines calibration settings for the user input; initiating gameplay of the video game using the calibration settings determined from the initial calibration, such that the calibration settings are applied to interpret instances of the user input occurring during the gameplay; determining a game context in which the instances of the user input occur; analyzing the determined game context, and adjusting the calibration settings based on the analysis of the determined game context.

Other aspects and advantages of the disclosure will become apparent from the following detailed description, taken in conjunction with the accompanying drawings, illustrating by way of example the principles of the disclosure.

BRIEF DESCRIPTION OF DRAWINGS

The disclosure may be better understood by reference to the following description taken in conjunction with the accompanying drawings in which.

DETAILED DESCRIPTION OF THE INVENTION

Broadly speaking, In video games using calibrated user inputs (e.g. gaze tracking, gesture/movement tracking, voice input, etc.), the calibration of such user inputs is generally performed only once prior to gameplay. However, if the calibration is poor, or completed with low confidence, then the user is either forced to redo the calibration if the calibration is deemed to have failed, or endure difficulties and frustration during gameplay as a result of the poor calibration. This presents a poor user experience, and thus there is a problem of how to handle low confidence calibration in a video game without punishing the player with more calibration or poor results in-game.

Accordingly, implementations of the present disclosure provide systems and methods enabling in-game refinement of calibration of user inputs. Broadly speaking, a given user input such as gaze tracking or gesture tracking is calibrated once prior to initiating gameplay, and then further adjustments to the calibration are made based on in-game activity. In some implementations, a dynamic user interface is presented in the video game, and configured to provide additional calibration information. In some implementations, game context information is leveraged to further improve the calibration.

Figure 1:
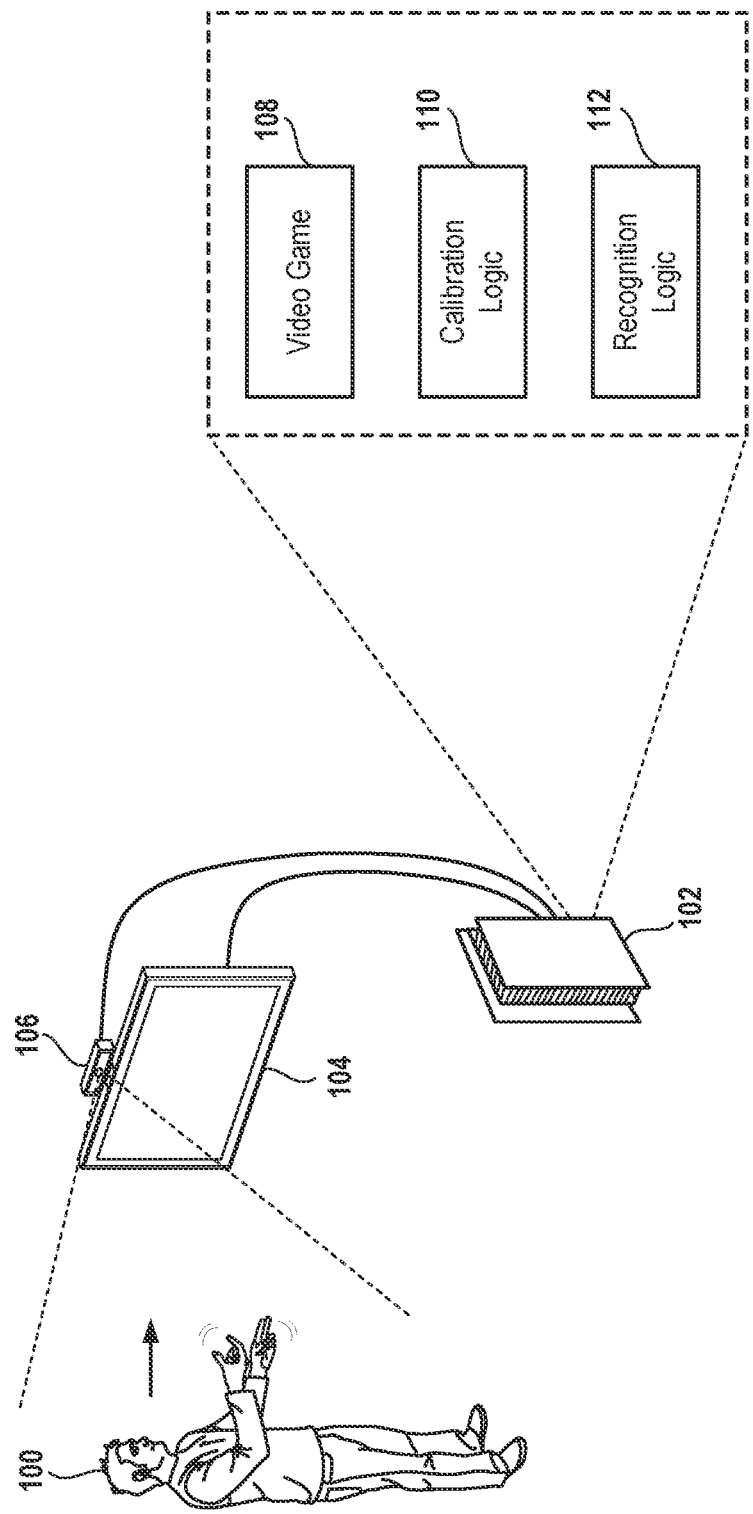
FIG. 1 conceptually illustrates a system for enabling gameplay of a video game, in accordance with implementations of the disclosure.

FIG. 1 conceptually illustrates a system for enabling gameplay of a video game, in accordance with implementations of the disclosure.

In the illustrated implementation, a user 100 engages in gameplay of a video game 108 executed by a computing device 102 (e.g. game console, personal computer, laptop, set-top box, tablet, mobile device, etc.). The gameplay video is presented on a display 104 (e.g. television, monitor, LCD/LED display, head-mounted display (HMD), etc.) for viewing by the user 100. It will be appreciated that for certain kinds of user inputs which are dependent upon recognition of the user 100's performance of certain activity, it is desirable to perform a calibration to enable improved recognition by the system. For example, gaze input and gesture input of the user 100, which may be captured by a camera 106, are examples of input activities requiring recognition by the system, and for which calibration is beneficial to tailor the recognition to the user 100. The computing device 102 implements calibration logic 110 to perform calibration of such user inputs. And more specifically, the calibration logic 110 is configured to calibrate the recognition performed by recognition logic 112, such as by adjusting/tuning or setting parameters of the recognition logic 112. In some implementations, the recognition logic 112 employs a recognition model (e.g. a machine learning model) which is tuned through the calibration process.

One example of a calibration technique for gaze tracking is to have the user 100 look at three (or some other number) fixed points presented on the screen of display 104. Based on the user's gaze data collected during this calibration process, a mapping is built between the user's gaze location and the corresponding pixel location on the screen. This mapping may be adjusted, for example, by applying a scale factor and/or offsets based on the three calibration points. Once the initial calibration is complete, the user is asked to look at a fourth point on the screen. If the user's gaze data does not match the predicted location, then there is low confidence in the calibration. However, further calibrating more pixels on the screen would be impractical and burdensome for the user. Therefore, there is a need for a more efficient way to refine calibration during gameplay without causing frustration or interruptions for the user.

As another example, gestures made by the user 100 may be captured by the camera 106, and applied as input to the video game 108. When calibrating gestures or other user inputs, the system may have a preconceived notion of what a given gesture should look like. However, if the user's calibration data consistently shows a gesture that is significantly different from what is expected, the system may have low confidence in the calibration.

Calibration generally involves building a calibration profile that maps some user action to a target, such as mapping gaze direction to a pixel location, or a user gesture to a target gesture. This may involve using scale factors, offsets, and linear or non-linear relationships to create a mapping between the user's input and the intended output. However, the calibration may not be perfect, as it is attempting to fit some predefined function or mapping construct to the user's input data.

When the calibration is performed, the system can indicate whether the data seems to be accurate or not. If the data is not accurate, the traditional way to adjust is to perform more and more calibration. However, this can lead to a poor user experience and may interrupt the gameplay. However, with poor calibration, then the user's inputs may not be accurately recognized, leading to poor outcomes during gameplay. Therefore, there is a need for a more efficient way to handle low confidence calibration without burdening the user with additional calibration or compromising the user's experience during gameplay.

Calibration can vary based on the individual user's needs. For example, some users may only need three calibration points for gaze tracking, while others may require four or five. Therefore, a one-size-fits-all approach to calibration may not be optimal for all users, and accordingly it is useful to provide a calibration technique which is capable of adjusting to the user's individual situation. For example, in the event that the initial calibration is inaccurate, it is not ideal to force the user to redo the calibration. Instead, the system can proceed with the calibration, even if it is sub-optimal, and then make additional adjustments during gameplay to refine the calibration. This can provide a better user experience and reduce frustration for the user, as they are not burdened with additional calibration steps that interrupt the gameplay. By providing a more efficient and effective method for handling low confidence calibration, the implementations of the present disclosure provide an improved user experience for video game players who use calibrated user inputs.

While in the illustrated implementation, the computing device 102 executes the video game 108 as well as the calibration logic 110 and the recognition logic 112, it will be appreciated that in other implementations, some or all of these components may be wholly or partially cloud executed, such as on a cloud compute resource having at least one processor and at least one memory. In some implementations, the video game 108 is cloud executed, whereas the calibration logic 110 and the recognition logic 112 are implemented locally on the computing device 102.

Figure 2:
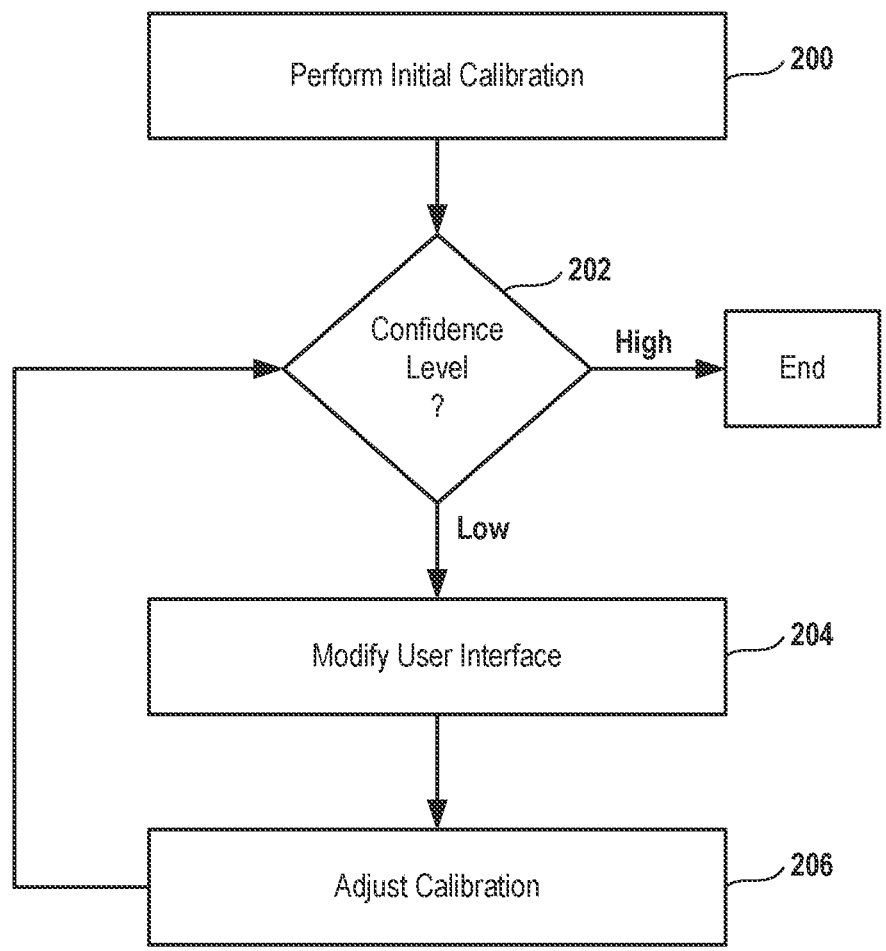
FIG. 2 conceptually illustrates a method for implementation of dynamic user interfaces in-game based on calibration quality, so as to enable improvement in calibration after an initial calibration, in accordance with implementations of the disclosure.

FIG. 2 conceptually illustrates a method for implementation of dynamic user interfaces in-game based on calibration quality, so as to enable improvement in calibration after an initial calibration, in accordance with implementations of the disclosure.

The present disclosure enables the use of dynamic user interfaces in video games to help refine calibration without negatively impacting the player experience. At method operation 200 in the illustrated method, an initial calibration of user input is performed. Then at method operation 202, the quality or confidence level of the calibration is determined. If the confidence level of the calibration is high (e.g. at or exceeding a predefined threshold), then the method ends, as the calibration can be used for the video game without further changes. However, when the calibration quality or confidence level is low (e.g. less than a predefined threshold), then at method operation 204, the system can inform the game and dynamically adjust the user interface accordingly.

For example, if the calibration is poor, when the system provides selectable options for the player (e.g. two options such as "start a new game" or "continue"), then the presentation of such options may be modified from their standard appearance in ways configured to enable obtaining further calibration input from the player. For example, in some implementations, selectable buttons are placed further apart and/or placed in specific locations to enable further refinement of the calibration. Such locations might be specifically defined as locations for which the calibration quality of the user input is low. Additionally, in some implementations, the system could make the buttons smaller than their standard size so as to require more precision when the player is selecting them. This may provide more meaningful calibration data due to the precision required, as well as ensure that the player intends to select a given button.

Implementation of verification procedures can also be affected by calibration quality. For instance, when the player chooses an option, such as whether to save or delete a game, a verification or confirmation prompt (e.g. "Are you sure?") may be triggered for those with poor or low confidence calibration. This can be beneficial for the player so as to prevent them from accidentally deleting their progress. On the other hand, those with good or high confidence calibration may not require such a verification prompt. This approach provides a more seamless and personalized experience for the player based on their individual calibration quality. By using a two-step verification for players who fall below a certain confidence level, this additional verification information can also serve as an additional calibration point used to improve the overall accuracy of the system. Thus, implementations of the present disclosure enable the use of various methods for handling low confidence calibration in video games, without punishing the player with additional calibration steps or poor decisions/results.

At method operation 206, the user input obtained through the modified user interface is processed to further refine or adjust the calibration for the player. For example, the placement of user interface elements and their selection by the user, and user responses to verification prompts, can serve as additional data used to refine the calibration of the user input. The method then returns to method operation 202, to determine whether the target high confidence level has been achieved, and therefore whether continued dynamic adjustment of user interfaces is required to further refine the calibration.

Figure 3:
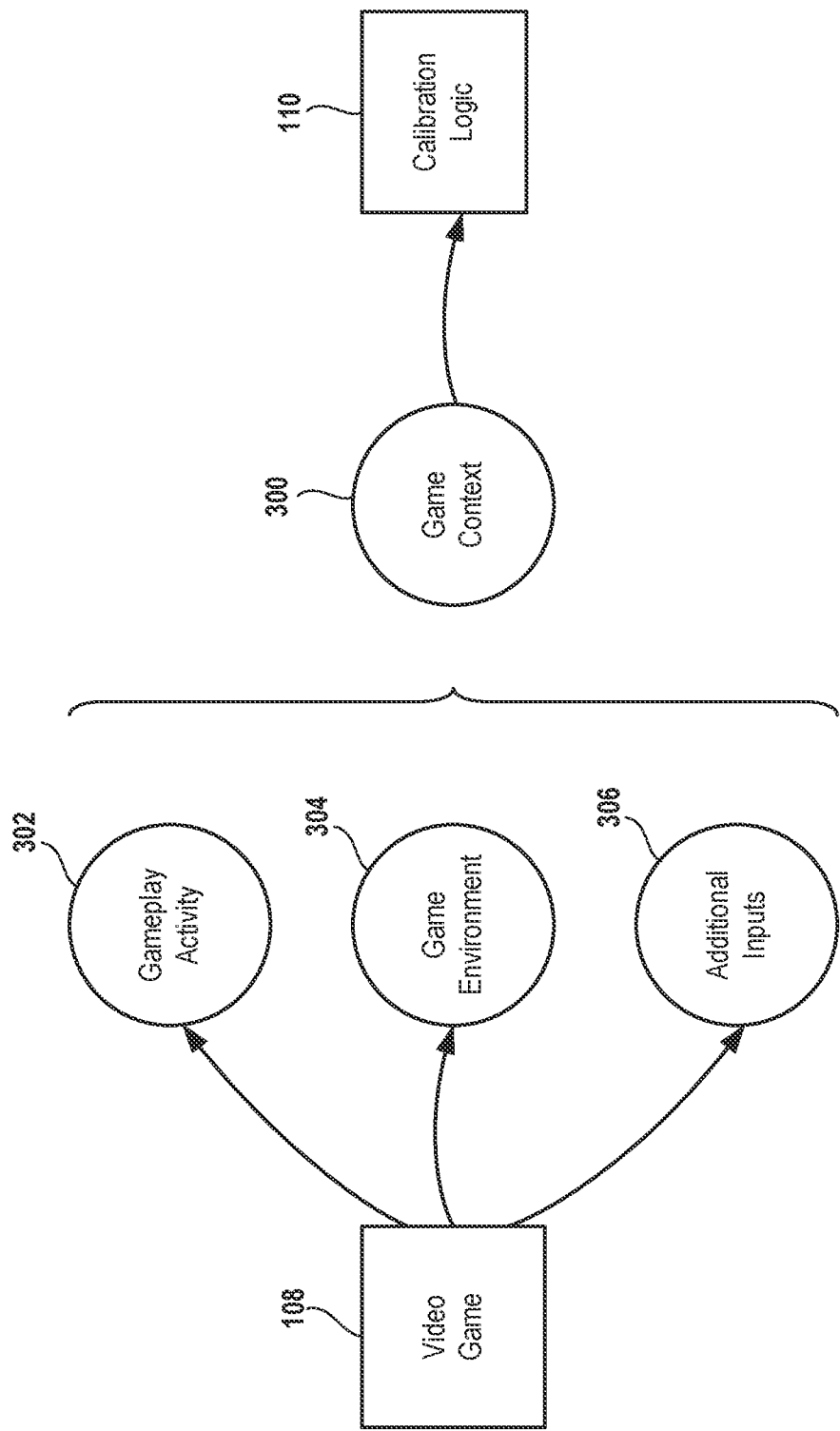
FIG. 3 conceptually illustrates using game context to refine calibration of user input, in accordance with implementations of the disclosure.

FIG. 3 conceptually illustrates using game context to refine calibration of user input, in accordance with implementations of the disclosure.

As shown in the illustrated implementation, as the video game 108 is executed and interactive gameplay occurs, game context 300 is generated, which can be leveraged by the calibration logic 110 to further refine the calibration of a user input. Broadly speaking, the game context 300 encompasses various aspects of gameplay or types of data generated therefrom which are useful for refining calibration, such as by informing whether and to what extent existing calibration settings are accurate, or providing additional points of calibration for the user input. By way of example without limitation, some examples of game context 300 include gameplay activity 302 (e.g. activity occurring in the video game session, actions initiated or triggered by the instant player or other players, etc.), game/virtual environment 304 (e.g. state data of the game environment, such as states of objects, locations of objects, properties of objects, etc.), and additional inputs 306 (e.g. additional forms of input that are processed and utilized by the video game). These and other types of game context, which are defined when a given calibrated user input is detected, can be used to further enhance the calibration.

Some examples in accordance with implementations of the disclosure serve to demonstrate methods for leveraging game context to refine calibration in-game. While calibration is typically performed before initiating gameplay, additional context during gameplay can help to refine the calibration. For example, a pointing gesture might be initially calibrated based on a hand pose and arm movement, e.g. having the user point at a specified location on the display screen. However, when the user makes the pointing gesture during gameplay of the video game, in-game context such as verbal commands and gaze direction can provide additional context for the gesture. A verbal command or gaze direction might or might not corroborate the calibration of the pointing gesture, and in either case, provide useful information for refining the calibration.

As another example, suppose the user points to a location in-game and says "I want to go over there," but the system takes them to the wrong location. The user might say "I didn't intend to go here." In response, the system could then prompt the user with "Where did you mean to go?" and the user could point again. These interactions provide additional points of calibration, such that an improved understanding of the user's intent during the first instance of pointing is obtained. This way, the system can use this information to correct and refine the calibration in real-time based on additional context provided during gameplay.

Broadening the concept, if the system performs the wrong action based on some user input, the system can prompt the user to indicate the correct action. This provides a second point of calibration, and the system can use this information to correct and refine the calibration. By leveraging game context in this way, the system can more accurately calibrate user inputs and improve the overall user experience.

Traditional calibration methods for video game user inputs often result in an all-or-nothing approach where calibration is deemed a pass or a fail. If the calibration fails, users are forced to redo the entire calibration process, which can be frustrating and disruptive to the overall gaming experience. Implementations of the present disclosure solve this problem by enabling in-game refinement of calibration, even if the initial calibration is not ideal or low confidence. Rather than requiring users to redo the calibration process, the system can continue with the low confidence calibration and provide ways to refine it during gameplay, in a way that feels natural and organic to the player. This approach enables a more seamless and enjoyable gaming experience while still achieving high accuracy in user input calibration.

As has been demonstrated, allowing players to initiate negative feedback can be an important aspect of refining calibration in-game. By providing players with a way to indicate that the game did not interpret their actions correctly, the system can use this feedback to improve calibration. Such feedback could be in the form of a verbal statement, an emotional response, a button press, etc. For example, a player may say "that's not what I meant" if the game does not respond as expected to their gesture. Alternatively, they may become visibly frustrated, which could be detected and interpreted by the system as negative feedback. The system can use this negative feedback to analyze and improve calibration.

In some implementations, the game could provide a replay of the player's previous actions and ask them to identify where the system went wrong. This would provide valuable information to refine the calibration, such as by providing feedback for a machine learning model.

In various implementations, other ways are provided to facilitate feedback to the system in-game if the calibration is off. For example, the system can detect when the user is struggling with a particular task and offer assistance or feedback to help them succeed. This can be done by monitoring the user's activity and comparing it to expected behavior or by looking at the game results and identifying areas where the user is consistently underperforming, for example, relative to a cohort of peers such as players with a similar skill level or player profile.

Furthermore, the system can also leverage other sources of data to automatically detect when the calibration is off. For instance, the system can monitor the user's emotional state during gameplay, as it may change if the user is having difficulty with the controls or if the calibration is inaccurate. Additionally, the system can crowdsource expected actions at a given point in the game from other players with similar skill levels and compare the user's actions against these expectations. If the user is consistently deviating from the expected behavior, it may indicate that the calibration is off. The system can then provide feedback to the user and refine the calibration accordingly.

In other implementations, other ways to feedback to the system in-game are provided, enabling the system to automatically detect that the calibration is off. For example, if the player keeps losing the game, this may indicate that calibration is off. Or if the user repeats an action (e.g. keeps trying to jump), this may indicate the calibration is off. Also, the user's emotional state may change when repeating an action, or they may perform the action faster when repeating the action, and this can be detected for feedback purposes.

Figure 4:
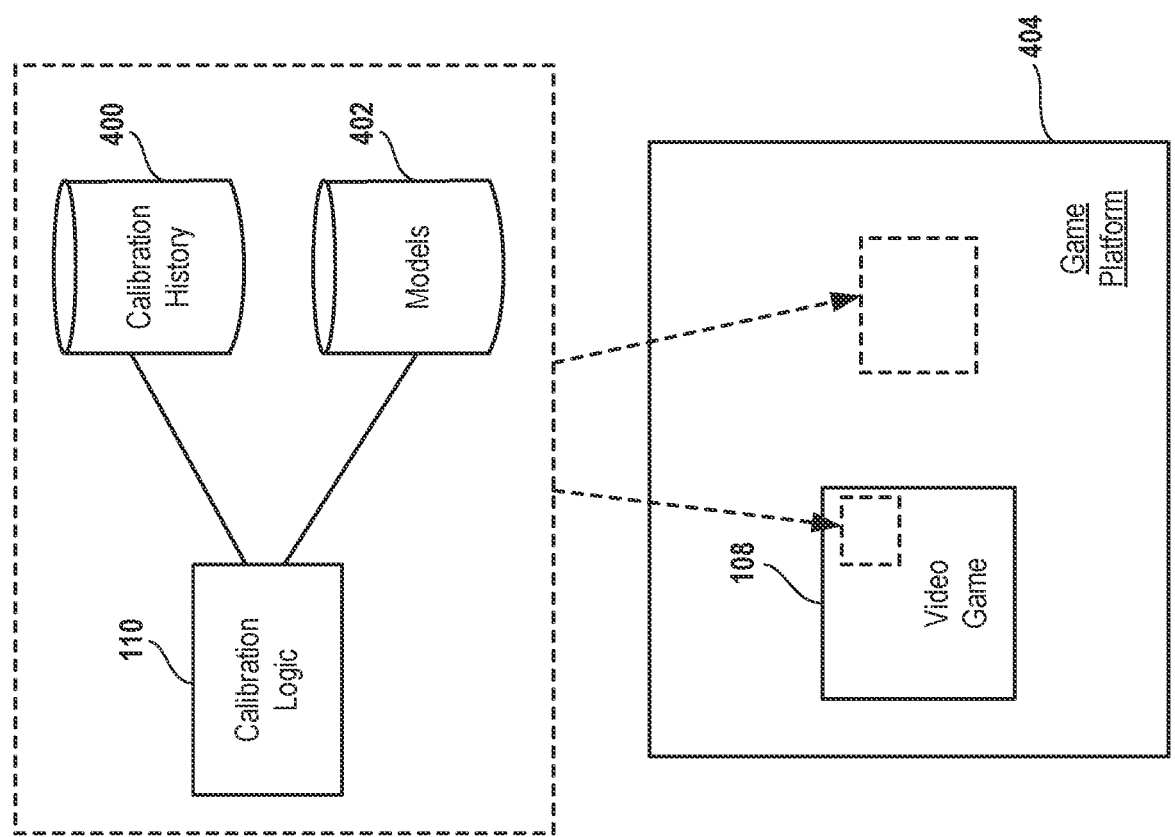
FIG. 4 conceptually illustrates a calibration system for use in video games, in accordance with implementations of the disclosure.

FIG. 4 conceptually illustrates a calibration system for use in video games, in accordance with implementations of the disclosure.

In some implementations, the calibration logic 110 is configured to store and build up a calibration history 400 that includes calibration data for the user generated through not only explicit calibration procedures, but also in-game contextual calibration events as has been described in the present disclosure. That is, such calibration data can include events occurring in-game, and in particular user inputs and the game context in which they occur, which are indicative or otherwise informative and useful for refining calibration or gauging the quality of an existing calibration.

In some implementations, the calibration of a given user input can be configured to work across multiple video games. Accordingly, the calibration history 400 can include calibration data from various game sessions across different video games. It will be appreciated that the different game contexts which occur in different games can be useful in different ways for refining calibration of a given user input. In this manner, events in video games performed involving the user's input can be treated not as statistically independent from each other, but can be utilized together to improve the calibration for the user. And thus the system is capable of building up context and history so that the calibration continues to be refined over time in a manner that feels more natural for the user.

For example, a gesture can be initially calibrated, and then its contextually specific use can be captured and analyzed. Hence, an understanding of contextual gestures can be built up by the system over time. Instead of forcing the user into performing very constrained gestures as defined by the system, the system is better able to capture the intent of the user when performing a gesture in context, and so refine the calibration to enable the user to make gestures more naturally which will also be properly recognized by the system.

In some implementations, one or more models 402 are employed by the calibration logic 110, and the recognition models 402 are calibrated and refined in accordance with implementations of the disclosure. In some implementations, the models 402 include one or more machine learning models.

In some implementations, the system is configured to determine the player's satisfaction with certain quality or confidence/probabilities of calibration, as some players might be more tolerant of a system that is less well calibrated to their input than others. And accordingly, based on the player's tolerance of calibration quality, the system may adjust the amount of additional calibration-related activity that is presented to the player.

In some implementations, there are pre-defined calibration templates that can provide a starting point for a given user's calibration. In some implementations, a predefined calibration template is used for more advanced/skilled/experienced players, enabling them to bypass, in whole or in part, an initial calibration process and thereby more quickly initiate gameplay. Whereas by contrast, a less advanced player may be required to perform the initial calibration process. The concept is such that a more advanced player can be reasonably expected to know how to perform the user inputs required for the video game in a manner that is more recognizable by the system with greater confidence, even in the absence of specific calibration. Whereas the less advanced player is not expected to be able to perform the user inputs in such a manner, and so is required to calibrate to a greater extent in order to ensure proper recognition of their inputs for a satisfactory gameplay experience.

It will be appreciated that the calibration system can be implemented in different ways. In some implementations, the calibration system is implemented at the game-level, or as part of the video game's logic itself. Whereas in other implementations, the calibration system is implemented at the system level or platform level, which the game can access, e.g. via API or by otherwise querying to it. In some implementations, the calibration system is implemented in a hybrid manner such that it is partially implemented at the game level and partially implemented at the system level or platform level. It will be appreciated that in some implementations, the system or platform is that of a local device such as a game console or personal computer, whereas in other implementations, the system or platform is that of a cloud gaming service, which supports cloud execution of the video game and streaming gameplay to the user's local device.

Figure 5:
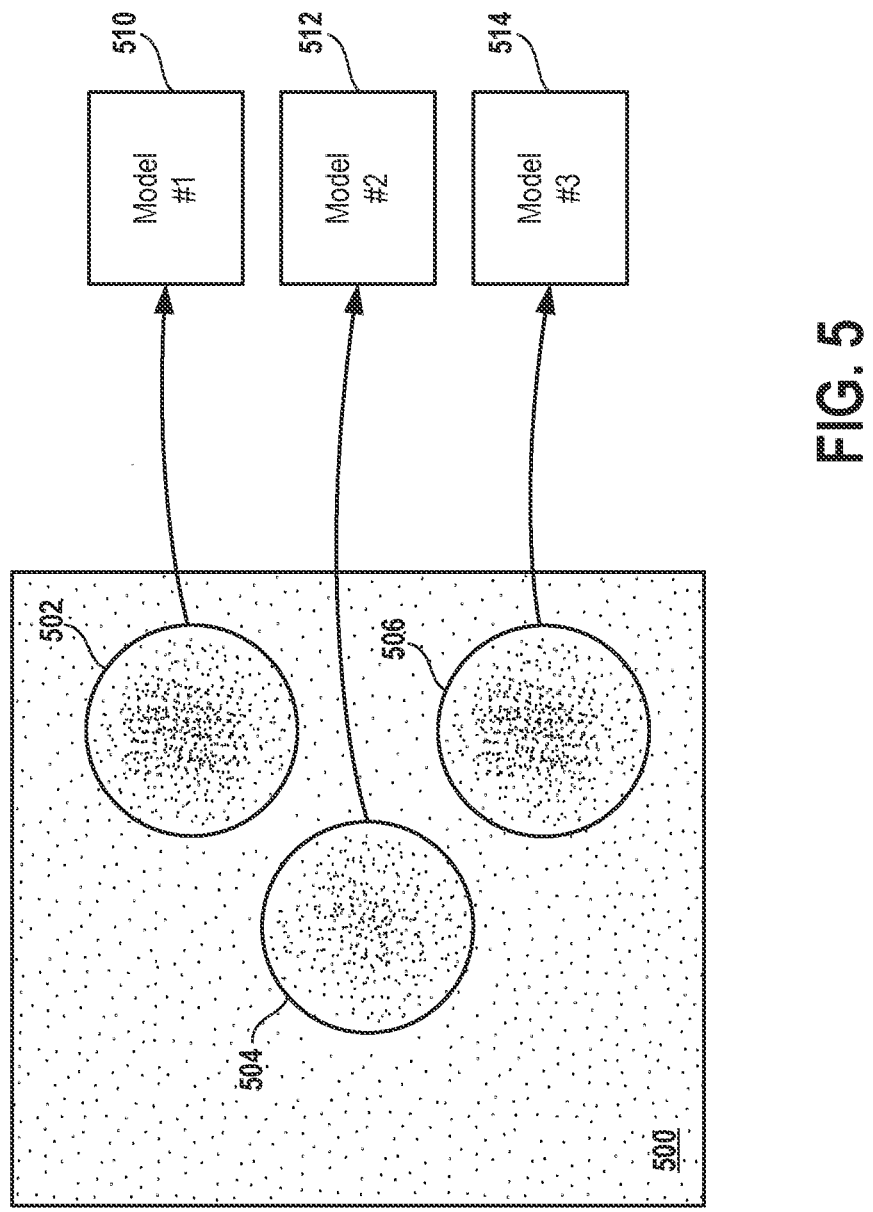
FIG. 5 conceptually illustrates clustering of users according to their input recognition profiles, in accordance with implementations of the disclosure.

FIG. 5 conceptually illustrates clustering of users according to their input recognition profiles, in accordance with implementations of the disclosure.

In some implementations, instead of having one recognition model for all users (e.g. players of a given video game or gaming platform, users of a particular input device, etc.), there can be different recognition models that are each optimized for different groups of users. In some implementations, clusters of users can be built implicitly by analyzing data describing the different ways in which users generate user inputs, and building clusters within it. For example, in the case of gestures, such data may describe the particular ways in which users make certain gestures, as well as characteristics of the users that may impact how they make the gestures.

The concept of clustering can be visualized in the illustrated implementation, wherein each person is a point in a large multi-dimensional space 500, with each dimension representing an aspect of how users generate user inputs, and various naturally occurring clusters of persons are identified in the space 500. In the illustrated implementation, clusters 502, 504, and 506 are conceptually shown. Each cluster can have a corresponding recognition model that is optimized for its users. For example, cluster 502 has a model 510 optimized for its users, whereas cluster 504 has a model 512 optimized for its users, and cluster 506 has a model 514 optimized for its users. In this manner, by using a specific model optimized for each cluster, user inputs can be better recognized rather than by using a generic model for all users.

In some implementations, determination of clusters is performed using an unsupervised machine learning technique. In some implementations, clusters are determined using a density/distribution/centroid-based algorithm. Examples of such algorithms include K-means, DBSCAN, Gaussian Mixture Model, BIRCH, affinity propagation clustering, mean-shift clustering, OPTICS, etc.

In accordance with the above, then in some implementations, the calibration process entails determining which cluster a given user falls within. In some implementations, this can be achieved by presenting an interface asking the user specific questions which are calibrated so that the user's responses indicate which cluster to which the user belongs, and likewise which corresponding recognition model will be optimal for the user. In some implementations, this can take the form of a decision tree, such that one question eliminates some of the clusters, another question eliminates more of the clusters, etc. until the system determines which cluster the user falls within. For example, in the case of gestures, the user might be asked to perform a series of gestures, and the manner in which the user performs the requested gestures will identify the cluster to which the user belongs.

While recognition concepts such as clustering as presently described have been discussed with reference to gestures as an example of user input, it will be appreciated that the principles of the present disclosure may be applied to other types of user inputs such as eye/gaze tracking, voice recognition, etc.

Figure 6:
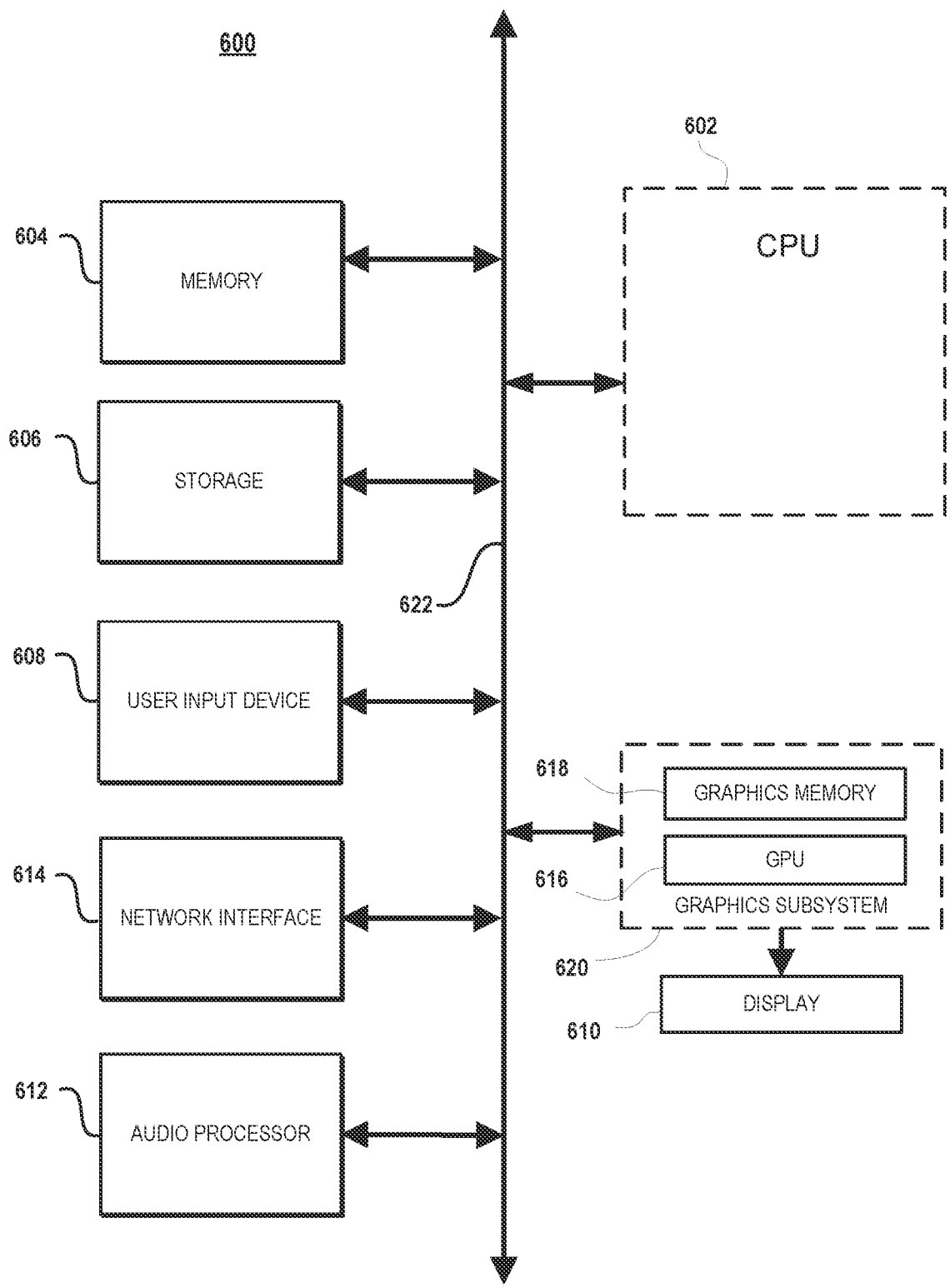
FIG. 6 illustrates components of an example device 600 that can be used to perform aspects of the various embodiments of the present disclosure.

FIG. 6 illustrates components of an example device 600 that can be used to perform aspects of the various embodiments of the present disclosure. This block diagram illustrates a device 600 that can incorporate or can be a personal computer, video game console, personal digital assistant, a server or other digital device, suitable for practicing an embodiment of the disclosure. Device 600 includes a central processing unit (CPU) 602 for running software applications and optionally an operating system. CPU 602 may be comprised of one or more homogeneous or heterogeneous processing cores. For example, CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 600 may be a localized to a player playing a game segment (e.g., game console), or remote from the player (e.g., back-end server processor), or one of many servers using virtualization in a game cloud system for remote streaming of gameplay to clients.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 610, and audio processor 612 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 608, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 614 periodically outputs pixel data for an image from graphics memory 618 to be displayed on display device 610. Display device 610 can be any device capable of displaying visual information in response to a signal from the device 600, including CRT, LCD, plasma, and OLED displays. Device 600 can provide the display device 610 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation may be produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A computer-implemented method comprising:
obtaining initial calibration settings for user inputs to a video game, the initial calibration settings being generated using an initial calibration process;
interpreting an instance of a particular user input that occurred during gameplay of the video game, using the initial calibration settings;
determining an in-game context that corresponds to the instance of the particular user input;
determining that the in-game context is not consistent with the interpreted instance of the particular user input; and
adjusting the initial calibration settings based at least on determining that the in-game context is not consistent with the interpreted instance of the particular user input.

2. The method of claim 1, wherein determining that the in-game context is not consistent with the interpreted instance of the particular user input comprises determining that the in-game context does not corroborate the interpreted instance of the particular user input.

3. The method of claim 1, wherein determining that the in-game context is not consistent with the interpreted instance of the particular user input comprises determining an object that is pointed at by the particular user input.

4. The method of claim 1, wherein determining that the in-game context is not consistent with the interpreted instance of the particular user input comprises determining that a verbal command made by a user is not associated with the interpreted instance of the particular user input.

5. The method of claim 1, wherein determining that the in-game context is not consistent with the interpreted instance of the particular user input comprises determining that a gaze direction of a user is not associated with the interpreted instance of the particular user input.

6. The method of claim 1, wherein determining that the in-game context is not consistent with the interpreted instance of the particular user input comprises determining that a user has expressed dissatisfaction with an in-game context.

7. The method of claim 1, wherein determining that the in-game context is not consistent with the interpreted instance of the particular user input comprises identifying an instance of a subsequent, corrective user input.

8. The method of claim 1, wherein adjusting the initial calibration settings comprises mapping a new intent to the particular user input.

9. A system comprising:
one or more computer processors; and
one or more non-transitory computer-readable media that store instructions which, when executed by the one or more computer processors, cause the one or more computer processors to perform operations comprising:
obtaining initial calibration settings for user inputs to a video game, the initial calibration settings being generated using an initial calibration process;
interpreting an instance of a particular user input that occurred during gameplay of the video game, using the initial calibration settings;
determining an in-game context that corresponds to the instance of the particular user input;
determining that the in-game context is not consistent with the interpreted instance of the particular user input; and
adjusting the initial calibration settings based at least on determining that the in-game context is not consistent with the interpreted instance of the particular user input.

10. The system of claim 9, wherein determining that the in-game context is not consistent with the interpreted instance of the particular user input comprises determining that the in-game context does not corroborate the interpreted instance of the particular user input.

11. The system of claim 9, wherein determining that the in-game context is not consistent with the interpreted instance of the particular user input comprises determining an object that is pointed at by the particular user input.

12. The system of claim 9, wherein determining that the in-game context is not consistent with the interpreted instance of the particular user input comprises determining that a verbal command made by a user is not associated with the interpreted instance of the particular user input.

13. The system of claim 9, wherein determining that the in-game context is not consistent with the interpreted instance of the particular user input comprises determining that a gaze direction of a user is not associated with the interpreted instance of the particular user input.

14. The system of claim 9, wherein determining that the in-game context is not consistent with the interpreted instance of the particular user input comprises determining that a user has expressed dissatisfaction with an in-game context.

15. The system of claim 9, wherein determining that the in-game context is not consistent with the interpreted instance of the particular user input comprises identifying an instance of a subsequent, corrective user input.

16. The system of claim 9, wherein adjusting the initial calibration settings comprises mapping a new intent to the particular user input.

17. One or more non-transitory computer-readable media that store instructions which, when executed by the one or more computer processors, cause the one or more computer processors to perform operations comprising:
    obtaining initial calibration settings for user inputs to a video game, the initial calibration settings being generated using an initial calibration process;
    interpreting an instance of a particular user input that occurred during gameplay of the video game, using the initial calibration settings;
    determining an in-game context that corresponds to the instance of the particular user input;
    determining that the in-game context is not consistent with the interpreted instance of the particular user input; and
    adjusting the initial calibration settings based at least on determining that the in-game context is not consistent with the interpreted instance of the particular user input.

18. The media of claim 17, wherein determining that the in-game context is not consistent with the interpreted instance of the particular user input comprises determining that the in-game context does not corroborate the interpreted instance of the particular user input.

19. The media of claim 17, wherein determining that the in-game context is not consistent with the interpreted instance of the particular user input comprises determining an object that is pointed at by the particular user input.

20. The media of claim 17, wherein determining that the in-game context is not consistent with the interpreted instance of the particular user input comprises determining that a verbal command made by a user is not associated with the interpreted instance of the particular user input.

21. The media of claim 17, wherein determining that the in-game context is not consistent with the interpreted instance of the particular user input comprises determining that a gaze direction of a user is not associated with the interpreted instance of the particular user input.

22. The media of claim 17, wherein determining that the in-game context is not consistent with the interpreted instance of the particular user input comprises determining that a user has expressed dissatisfaction with an in-game context.

23. The media of claim 17, wherein determining that the in-game context is not consistent with the interpreted instance of the particular user input comprises identifying an instance of a subsequent, corrective user input.

* * * * *